(No Model.)

L. C. HILLER & W. R. MACKAY.
CHEESE HOLDER.

No. 521,612.  Patented June 19, 1894.

WITNESSES
H. A. Lamb
Susie V. Richardson

INVENTORS
Louis C. Hiller and
William R. Mackay
By A. M. Wooster, Atty.

UNITED STATES PATENT OFFICE.

LOUIS C. HILLER AND WILLIAM R. MACKAY, OF MERIDEN, CONNECTICUT, ASSIGNORS TO THE MERIDEN SILVER PLATE COMPANY, OF SAME PLACE.

CHEESE-HOLDER.

SPECIFICATION forming part of Letters Patent No. 521,612, dated June 19, 1894.

Application filed January 15, 1894. Serial No. 496,871. (No model.)

*To all whom it may concern:*

Be it known that we, LOUIS C. HILLER and WILLIAM R. MACKAY, citizens of the United States, residing at Meriden, in the county of New Haven and State of Connecticut, have invented certain new and useful Improvements in Cheese-Holders; and we do hereby declare the following to be a full, clear, and exact description of the invention, such as will enable others skilled in the art to which it appertains to make and use the same.

Our invention has for its object to provide a neat and attractive device for holding small cheeses of the variety which it is customary to place upon the table whole, for example Edam and pineapple cheeses.

With this end in view we have devised the novel cheese-holder which we will now describe referring by numbers to the accompanying drawings forming part of this specification, in which—

Figure 1:
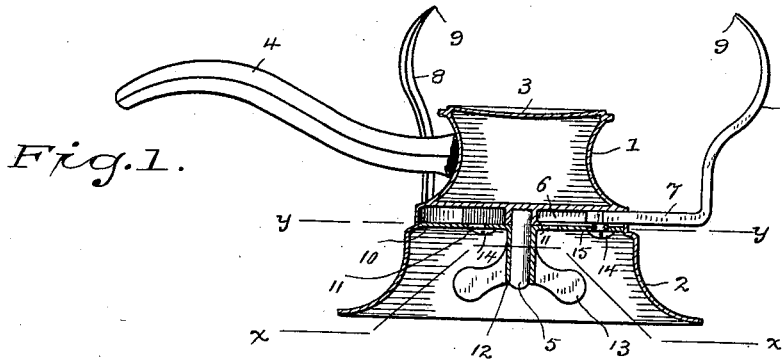
Figure 2:
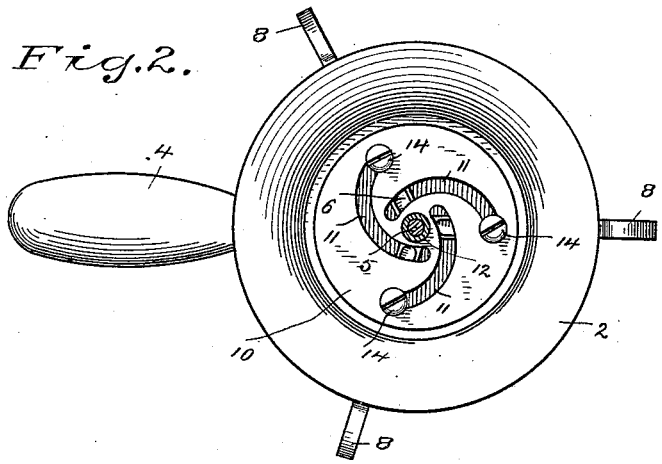
Figure 3:
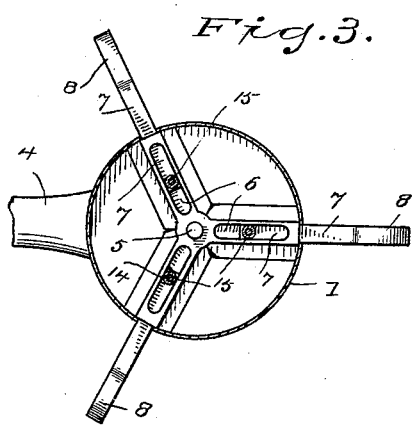
Figure 4:
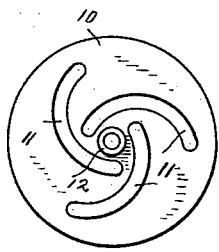

Figure 1 is a vertical section; Fig. 2 an inverted plan view the sleeve and stud being in section on the line $x\,x$ in Fig. 1; Fig. 3 a section on the line $y\,y$ in Fig. 1 looking up, and Fig. 4 is a plan view of the disk.

1 denotes the stand which may be of any ordinary or preferred construction, this stand is in practice provided with an ornamental base 2 upon which it rests, with a slightly concave table 3 upon which the cheese rests, with a suitable handle 4, and on its under side with a downwardly extending stud 5 and with ways 6 in which the shanks 7 of the arms 8 slide. These arms extend upward from the shanks and are curved and recurved outward and then inward the tips thereof being pointed as at 9 to adapt them to engage a cheese and hold it firmly.

10 denotes a disk which is provided with curved slots 11 and on its under side with a sleeve 12 which is adapted to fit over the stud loosely enough to permit it to be turned freely, said sleeve being provided with a finger piece 13 for convenience in operation.

The parts are assembled by placing the shanks of the arms in the ways then placing the disk in position and then passing screws 14 through the curved slots the inner ends of the screws engaging threaded holes in the shanks, see Fig. 3. In practice we preferably provide rollers 15 through which the screws pass and which travel in the curved slots, thus insuring perfect freedom of movement in use.

It will of course be understood that the details of construction may be varied within reasonable limits without departing from the principle of our invention, for example we have shown our novel cheese-holder as provided with three arms although more may be used if preferred.

The operation will be clearly understood from the drawings. It will be apparent that oscillation of the disk by means of the finger piece will cause the arms to move in or out as may be required.

No means for locking the arms is shown as it is obvious that when once placed in engagement with a cheese they will remain fixed in position against any power that can possibly be brought to bear against them in scooping out cheese in use.

Having thus described our invention, we claim—

A cheese-holder consisting of a suitable stand having a table upon which a cheese rests, a central stud and ways 6, curved arms which are adapted to engage a cheese and are provided with shanks engaging the ways, a disk having curved slots, and a sleeve adapted to receive the shank and provided with a finger piece, and screws carrying rollers which engage the slots and themselves engage the shanks as and for the purpose set forth.

In testimony whereof we affix our signatures in presence of two witnesses.

LOUIS C. HILLER.
WILLIAM R. MACKAY.

Witnesses:
LEMOINE N. FAY,
E. S. THOMPSON.